United States Patent [19]

Stark et al.

[11] 4,223,579
[45] Sep. 23, 1980

[54] MACHINE TOOL

[75] Inventors: Gerhard Stark, Beethovenstr. 21, 7311 Notzingen, Fed. Rep. of Germany; Günther Blum, Gullen/Ravensburg, Fed. Rep. of Germany

[73] Assignee: Gerhard Stark, Notzingen, Fed. Rep. of Germany

[21] Appl. No.: 1,889

[22] Filed: Jan. 8, 1979

[30] Foreign Application Priority Data

Sep. 16, 1977 [DE] Fed. Rep. of Germany ....... 2741802

[51] Int. Cl.³ .................. B23B 3/34; B23B 39/08; B23B 39/20
[52] U.S. Cl. .................................. 82/3; 408/3; 408/35
[58] Field of Search .................. 82/3, 2 B; 408/3, 35

[56] References Cited

U.S. PATENT DOCUMENTS

| | | | |
|---|---|---|---|
| 2,953,046 | 9/1960 | Jones | 408/3 |
| 3,413,702 | 12/1968 | Burg | 408/35 |
| 3,797,363 | 3/1974 | Nohejl | 408/35 |
| 3,975,109 | 8/1976 | Frazierr | 408/35 |

*Primary Examiner*—Harrison L. Hinson
*Attorney, Agent, or Firm*—Michael J. Striker

[57] ABSTRACT

The turret machine tool comprises a set of tool spindles which are driven via a built-in transmission gears by a direct current motor having a relatively stable torque in a wide range of rotational speeds such as a multiple direct current motor having permanent magnetic field and further including means for electrically controlling the speed of the motor according to a predetermined numerically controlled program.

30 Claims, 8 Drawing Figures

MACHINE TOOL

BACKGROUND OF THE INVENTION

This invention relates generally to a machine tool and more particularly it relates to a machine tool of the type having a driving spindle driven by an electromotor and a turret head portion for supporting a plurality of tool holders and for positioning a selected tool holder into alignment with the driving spindle, whereby the facing ends of the driving spindle and of the tool holder are provided with coupling members and further including feed mechanism for axial displacement of the driving spindle and the tool holder. From prior art an automatic machine tool of this type is known in the form of a turret drill in which the tool holders are made as drill spindles which include respectively a working spindle and driving gears assigned thereto. The driving spindle is driven by an alternating current motor and is directly coupled to each driver spindle. The rotary speed of the working tool is in each individual case determined by the transmission ratio of the gears in the drill spindle. As a consequence if a large range of rotary speeds is required there are necessary many drill spindles with corresponding transmission gears. However, the gears having a high transmission ratio are expensive and also there are problems as far as the size of the transmission unit and the torque transmission are concerned. To define the length and the speed of the feed of the tool each driver spindle is provided with its own signalling elements in the form of cams, fixed stops and switches, amount controllers and the like. As a rule, during the exchange of the working tool it is necessary to replace the whole driver spindle for another one so that the tool can be adjusted via the corresponding transmission gears to correct rotary speed and via each setting member to the correct feed. By means of the coupling between the driving spindle and the drill spindle, working tool is driven at the necessary rotational speed and a feed mechanism imparts the feeding movement to the coupling. As a consequence, a considerable axial pressure is to be taken up by the coupling elements. Respective drill spindles are transported into their position by mechanical means; they are seated in a turret in the form of a Maltese cross wheel which is driven by a separate motor and therefore only a steplike change of working position of respective drill spindles is possible. The disadvantage of such prior art arrangement of the machine tool is the fact that the positioning of respective working tools is difficult, the control of the working cycle is expensive, the power output—and the range of rotational speed is limited, adjustment time is large, the structure is heavy and due to the necessary transmission gears and motors very costly.

SUMMARY OF THE INVENTION

It is therefore a general object of the present invention to overcome the aforementioned disadvantages.

More particularly, it is an object of the invention to provide an improved machine tool which is substantially simpler in structure and easier to operate.

Another object of the invention is to provide such an improved machine tool which has minimum setting up times.

A further object of the invention is to provide a machine tool which is adapted for being controlled automatically according to a program.

In keeping with these objects, and others which will become apparent hereafter, one feature of the invention resides, in a machine tool of the aforedescribed type, in the provision of driving means for respective working tools which includes a direct current driving motor having a relatively stable torque in a wide range of rotational speeds and means for electrically controlling the rotational speed and the position of its rotor according to a predetermined program. This program is determined in response to the desired feeding speed and to the desired length of travel of the tool holder. In the preferred embodiment, the driving direct current motor is a servo-motor with a permanent magnetic field. Such servo-motors as known has light weight, small size, very high torque even at low rotational speeds and due to its high ratio between its torsional moment and inertia moment a high acceleration and reactivity. The direct current servo-motor is a multipole motor and as a rule is electrically controlled via a thyristor amplifier. According to another feature of this invention, the parameters of the driving direct current motor in the machine tool of this invention, namely the size of the motor, its power, its torsional moment and its rotational range are intentionally below the limits which would otherwise be required for the operation of the machine in its designed range of application. Such underdimensioning of the driving motor hitherto has been applied for feed driving motors and not for the main power drive for working tools. The application of the driving motor of this invention in spite of its underdimensioning enables a continuous regulation of rotational speed, is inexpensive and has output characteristics well suited for machining. Especially it has very high thermal time constant so that it can be overloaded for an extended period of time and without the danger of being overheated.

According to still another feature of this invention the maximum power output of the driving motor of this invention is devised to be about half of the actual power consumed during its operation. The maximum peak of impulses of its torsional moment can reach about ten times the value of its nominal torsional moment.

If the machine is constructed as a turret drill having a plurality of driving spindles, there are provided according to one feature of this invention, groups of transmission gears assigned for respective driving spindles. Each group of transmission gears has different transmission ratio whereby it has been proved to be of particular advantage when the drilling spindles are divided into two groups, one having a transmission ratio i=1:1 and the other group having transmission ratio i=4:1. In combining these transmission gears groups with the drive according to this invention, the conventional multi-stage gear shift mechanism can be dispensed with and the torsional moment is transmitted directly from the driving motor via a transmission belt through the driving spindle and via the coupling means to the drilling spingle and to the working tool. This arrangement has an additional advantage that in the event when damage of the transmission gears occurs it can be quickly corrected by replacing the whole drilling spindle. In exchanging the working tools during the drilling operation, it is no longer necessary to exchange the whole drilling spindle but it is sufficient to exchange the working tool only and consequently a reduced number of drilling spindles in the machine is required. Also the re-adjustment of fixed stops, cams, regulators and the like is no longer necessary for defining the feed of the tool according to its rotary speed and its speed of travel and consequently the non-operative time of the machine is substantially reduced.

It is true that the direct current motor in the application according to this invention has a lower torsional moment when its rotational speed is low. Due to the provision of the aforementioned transmission gears for the range of low rotational speeds required for the tool it is achieved that the driving motor operates only in a single range of its rotational speeds in which the generated torsional moment is sufficient for driving the tool at low rotations. In the aforedescribed range of transmission ratios of the gears for respective drilling spindles and for the range of rotary speed of the driving motor for example 1 to 8, there is possible to apply to the working tool all rotational speeds at sufficient torsional moment that are required in practice. In exceptional cases it is always possible to apply drilling spindles having lower or higher transmission ratio of their gears whereby the rotary speed of the motor can be increased. Accordingly, it is possible to use a great variety of working tools operable at different rotary speeds when the drilling spindles remain unchanged in the turret and as a rule in a great majority of cases the spindles remain in the turret without change.

According to still another feature of this invention it is of particular advantage when the direct current motor of this invention drives in addition to the driving spindle also via a separate coupling device the turret with working tools. In this manner the driving D.C. motor takes over the alignment of the selected working tool with the driving spindle and the positioning of the turret. By virtue of the elimination of a separate turret drive there results a substantial constructional simplification of the machine, respective working tool holders can be aligned more quickly and the unproductive non-operational times of the machines are further reduced. The coupling of the motor to the turret is made automatically for example when the machine tool is constructed as a machining center. This coupling takes place within the last 25 mm of the stroke of the spindle.

In one embodiment according to this invention the device for exchanging the tools is constructed as a turret wheel provided along its peripheral portion with passages for accommodating the working tool holders or the driving spindles during their axial feeding whereby the turret wheel is coupled via gears to the driving direct current motor. A switching device permits the movement of the turret wheel only when the driving spindle is in its starting position.

In the case when the machine tool is constructed as a machining center coupling means between the working tool and the driving tool include a spline shaft movable in a coupling gear provided with corresponding grooves whereby the spline shaft is axially displaceable therein. Preferably the coupling gear is in mesh with the gear connected to the driving spindle. The spline shaft is axially movable in an axially fixed driving gear which is coupled by transmission means to the direct current motor. In this manner it is achieved a completely compact and simple structure of the machine of this invention. The coupling gear and the meshing gear for the driving spindle are preferably arranged in one housing block which is axially movable by means of a feeding mechanism. The feeding mechanism consist of a spindle nut fixed to the housing block and of a feed spindle driven by a separate auxiliary direct current motor (servo-motor). The coupling gear and the meshing gear for driving spindle are axially fixed in the housing block; the driving spindle passing through the gear and the housing block is also axially fixed relative to the latter and is displaceable to a fixed stop. In a further simplication of the structure of this invention, the spline shaft supports a gear which in response to the position of the spline shaft is engageable into another gear coupled to the turret wheel. The turret wheel is provided on its face with indexing borings and during the feeding movement of the driving spindle one end of the spline shaft enters the assigned boring. A position indicator is located over the driving wheel to enable the orientation of the spindle and another position indicator is arranged above the axle of the turret wheel to indicate its position. If the machine tool is constructed as a turret drill machine, the coupling means of this invention may include a coupling member connected to the driving spindle and another coupling member connected to the drilling spindle (working tool holder) whereby the coupling is effected by means of a separate power element in one case or coupling wheel after axial displacement of the driving spindle in another case. In the latter case the driving spindle is shaped in the form of a spline shaft passing through center boring provided with corresponding guiding grooves of the driving wheel driven by the direct current motor and of the coupling wheel. Preferably the coupling wheel is in the form of a gear which is in mesh with the gear connected for driving the turret wheel. To increase the coupling speed the driving spindle together with the associated coupling members is axially movable by means of the aforementioned power element which is also rotated in a housing block and axially movable by the feeding mechanism (direct current servo-motor). The turret wheel in this case is arrestable by means of an indexing bolt which preferably is also actuated by a power element; both power elements are made as hydraulic cylinder-piston units controlled by the same control device.

The programmable control for the machine of this invention is effected by means of a digital control device. Preferably, there is employed a three-axes or multi-axes digital control so that the digital control devices are used for controlling not only the direct current motor for driving the driving spindle, the turret for exchanging the working tools and the feeding mechanism but also for controlling the movement of the working tool supporting table (x axis and y axis). The combination of the driving direct current motor the rotational speed of which is coupled electrically with the digital control device capable of being pre-programmed in a technical bureau enables to control all essential movements of the supporting table and of the feed mechanism as well as the adjustment of the rotational speed of the work tool and the exchange of the work tools in the turret, the control being made by a data carrier especially a punched tape. Long readjustment works in the machine shops are thus substituted by short programming work in the technical department.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
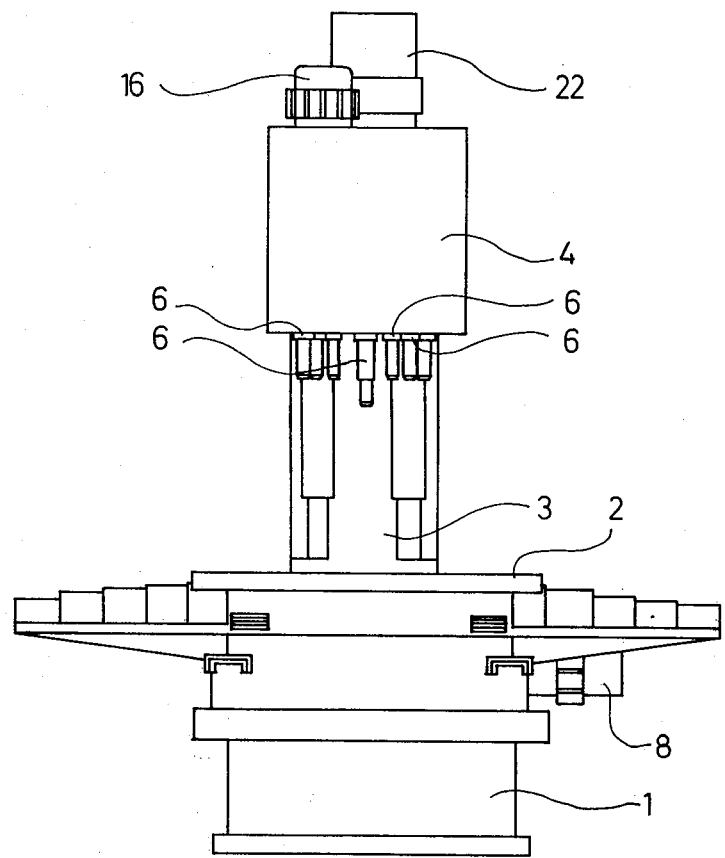
FIG. 1 is a front view of a machine tool constructed as a turret drilling machine.
Figure 2:
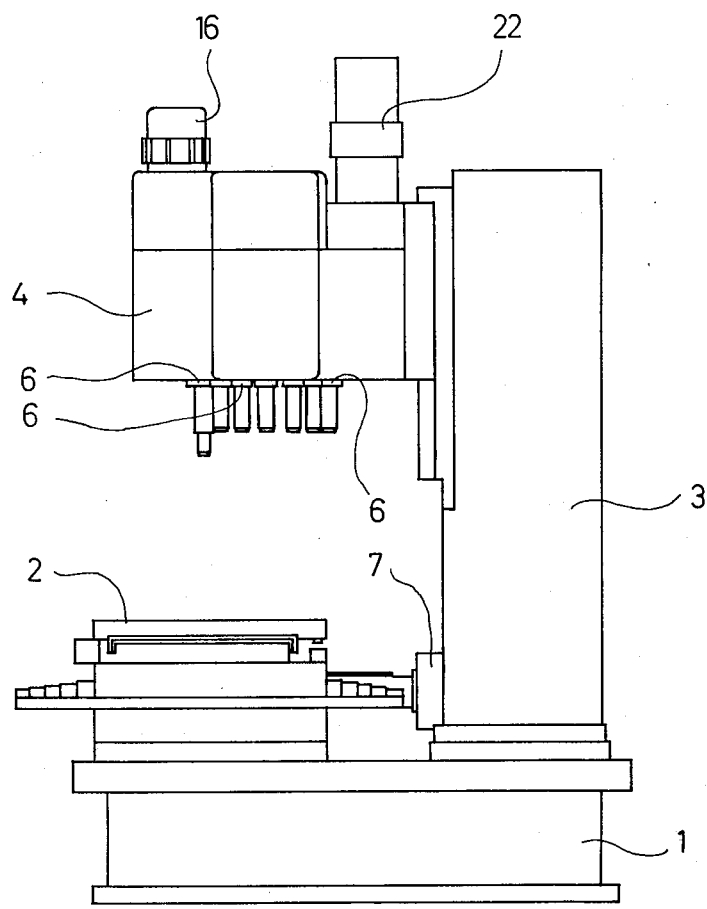
FIG. 2 is a side view of the machine of FIG. 1.

The machine tool of this invention is in FIGS. 1 and 2 illustrated in the form of a turret drilling machine including conventional parts such as base 1, upon which a working table 2 is displaceable in X- and Y-direction and supporting means for clamping a workpiece (not shown in the drawing). Stand 3 projects upwardly from base 1 and supports turret head 4 which is vertically adjustable and arrestable in a fixed working position. Turret head 4 supports a turret wheel 5 (switching drum) in which tool holders such as for example 12 drill spindles 6 are supported. The displacement of the turret wheel as well as the determination of the position of the table 2 in the X- and Y-axes is effected by means of a digital control device which also controls the feeding speed along both axes. For this purpose a direct current motor 7 takes care of the feeding in Y-direction and a direct current motor 8 moves table 2 in X-direction. Both motors 7 and 8 are pneumatically controlled by the aid of a tacho-generator and a rotational speed indicator.

Figure 3:
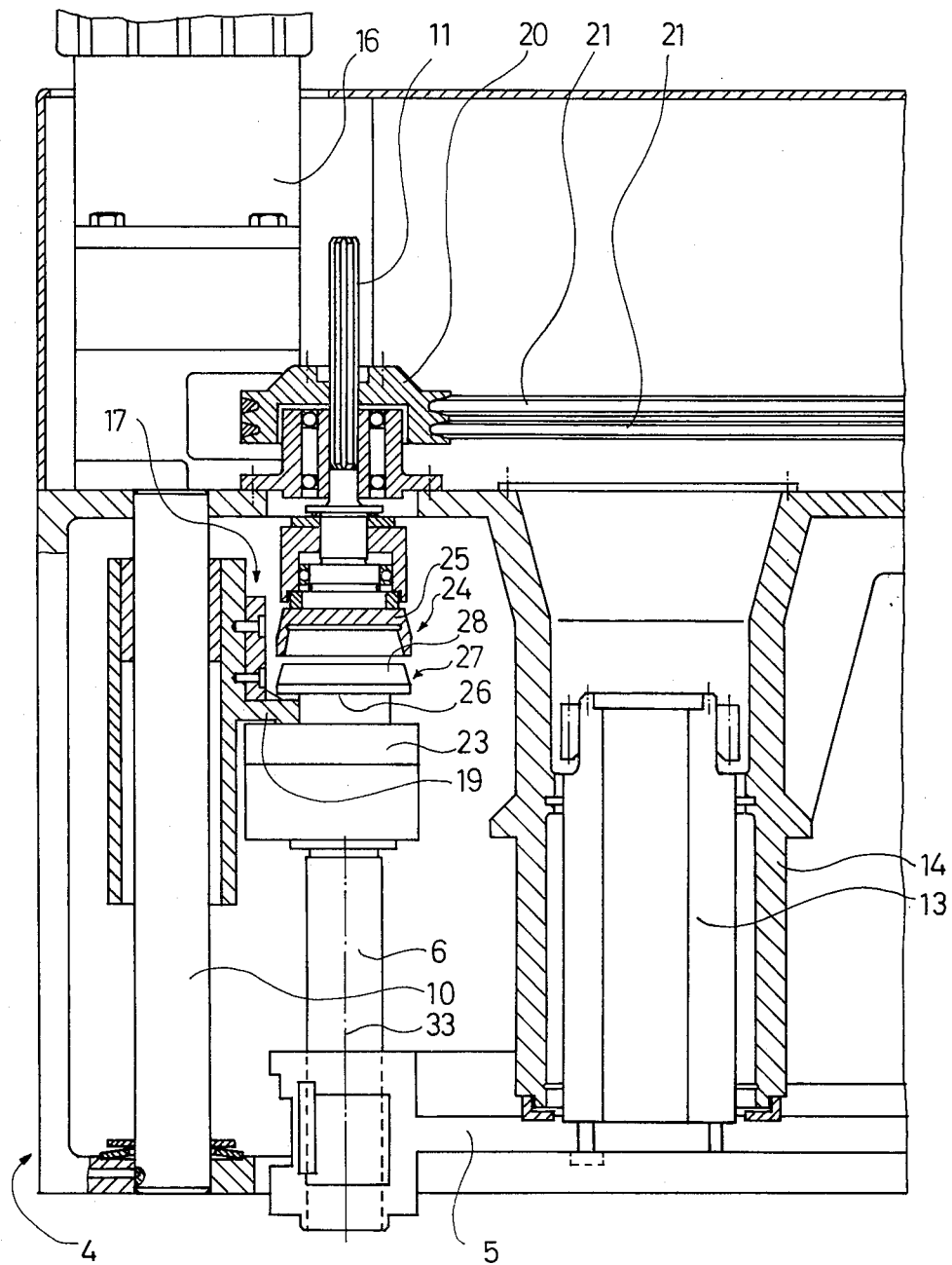
FIG. 3 is a sectional side view of one embodiment of the turret head in the machine of FIG. 2 showing one of the drill spindles in its working position.
Figure 4:
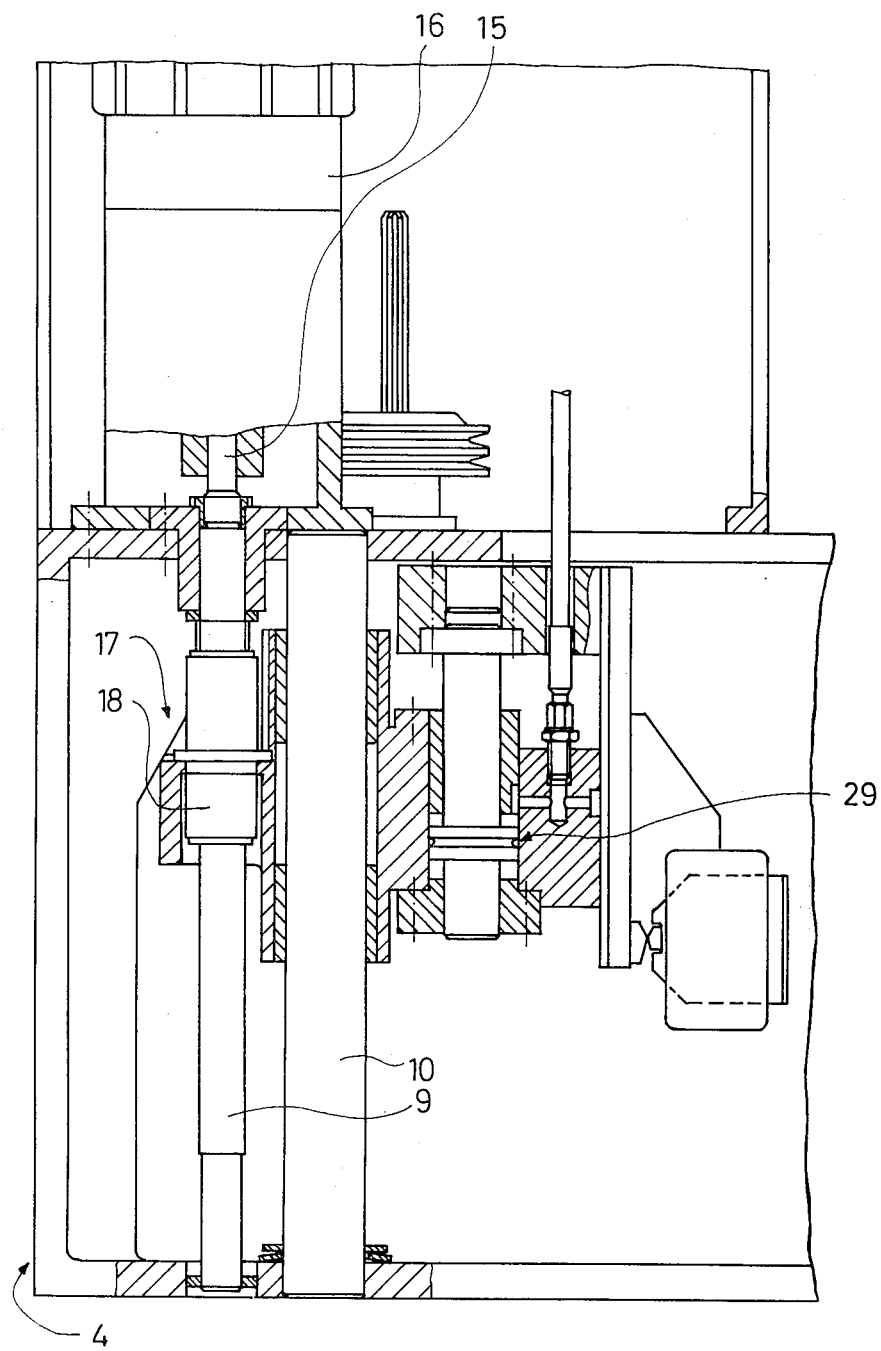
FIG. 4 is a sectional side view of the turret head of FIG. 3 showing the feeding device.
Figure 5:
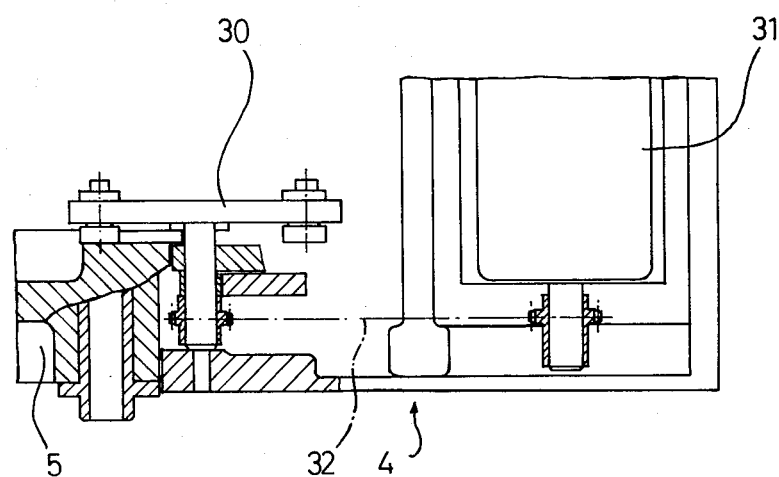
FIG. 5 is a sectional side view of a cut-away portion of the head of FIG. 3 showing the turret wheel.

In the embodiment shown in FIGS. 3 to 5, there is shown head 4 which includes feed spindle 9 in the form of a ball roller spindle, a guiding rod 10, a driving spindle 11, bore spindles 6 seated on a turret wheel 5 and a bearing piece 13. The components 6, 9, 10, 11 and 13 vertically arranged in the housing of head 4. Bearing piece 13 is a tubular piece supported for rotation in the housing portion 14 and having its lower end fastened by screws to the turret wheel 5. Feed spindle 9 is connected by means of an axially extended shaft 15 to an auxiliary direct current motor 16. Feed spindle 9 is threaded and supports for axial displacement nut 18 which carries housing block 12 acting as feed element 17. A projection 19 of feeding element 17 engages a corresponding circumferential groove in drill spindle 6. Spindle 6 is insertable laterally into its seat on turret wheel 5 and to define the position of the spindle 6 in the direction of the axis there is also used the same digital control device which controls the speed of feeding.

Driving spindle 11 is supported for axial displacement and is connected for rotation with driving wheel 20 which in turn is coupled via transmission means such as toothed belt 21 to the driving disc. The driving disc is rotated by the main driving unit 22 which is composed of an electrically controllable direct current motor of a programmable digital control unit. Each drill spindle 6 has its own transmission gear 23 which have transmission ratios divided in several groups so that the ratio of several transmission gears in one group is uniform. For example, if turret wheel 5 supports twelve drive spindles 6, a first group of let's say five spindles has gears with a transmission ratio i=4:1 and another group of seven spindles 6 has gears with a transmission ratio i=1:1. The first-mentioned group is employed for working tools which during the machining of a workpiece are supposed to operate at low rotational rate and at the same time require a high torsional moment; the second group having a direct transmission is employed for working tools requiring higher rotational speed. In this manner the required torsional moment can always be applied to the work tool even if motor 22 is a direct current motor which at lower rotational speed has a diminished rotational moment. The provision of drill spindle in the reduction gear insures that the direct current driving motor even at low rotational speeds of the working tool operates at a high rotational speed where its torque is optimum.

The facing ends of driving spindle 11 and of drill spindle 6 are provided respectively with coupling elements 25 and 28 which in the illustrated embodiment form together a cone clutch with a bell-shaped coupling member 24 and a matching cone shaped coupling member 27. As illustrated in FIG. 4, the separate power drive unit 29 such as for example a cylinder-piston hydraulic drive is incorporated in the feed mechanism 17 and controls the frictional connection or disconnection of driving spindle 11 to drill spindle 6. In the actuated condition of clutch 24 and 27 driving spindle 11 is subject to axial displacement imparted to a drill spindle 6 by feed mechanism 17. For stepwise rotation of turret wheel 5, in the shown embodiment, the turret wheel is in the form of a Maltese cross wheel which as illustrated in FIG. 5 is driven by driving member 30 actuated via chain 32 or via any suitable driving mechanism by driving motor 31. The outer jacket of each spindle 6 is seated on turret wheel 5 in such a manner that it is secured against rotation but is axially displaceable. As soon as turret wheel 6 places a selected spindle into alignment with driving spindle 11 so this position is secured by means of a suitable arresting or indexing device, as illustrated in the drawing.

The machining of a workpiece is digitally controlled according to a program. The necessary commands are emitted from a data carrier such as for example a punched band. This digital information controls via motors 7 and 8 table 2 and place it at a predetermined speed and direction of travel to its correct position; similarly, the digital data control vertical adjustment of the head 4 and further control via motor 31 and turret wheel the working position of the particular drill spindle 6 in which its axis 33 is aligned with driving spindle 11. In doing so, the main driving motor 22 rotates at a speed determined by the program so that a desired torque and rotary speed is imparted to the working tool (not shown) disposed in drill spindle 6. On coupling by means of clutch 29 and 24 the driving spindle 11 to stop shaft 26 the auxiliary servo-motor 16 rotates feed spindle 9 in a direction and speed determined by the program and displaces nut 18 on fixed spindle 9 and via projecting arm 19 the drill spindle 6 so that working tool machines the workpiece with the desired speed.

If it is desired to exchange tools in respective drill spindles 6, the latter as a rule remain in turret wheel 5 and only a corresponding exchange of the program data carrier has to be made, the new program being prepared in a separate technical office which determines the path of feeding, the feed speed and the rotational speed of the newly applied working tools.

Figure 6:
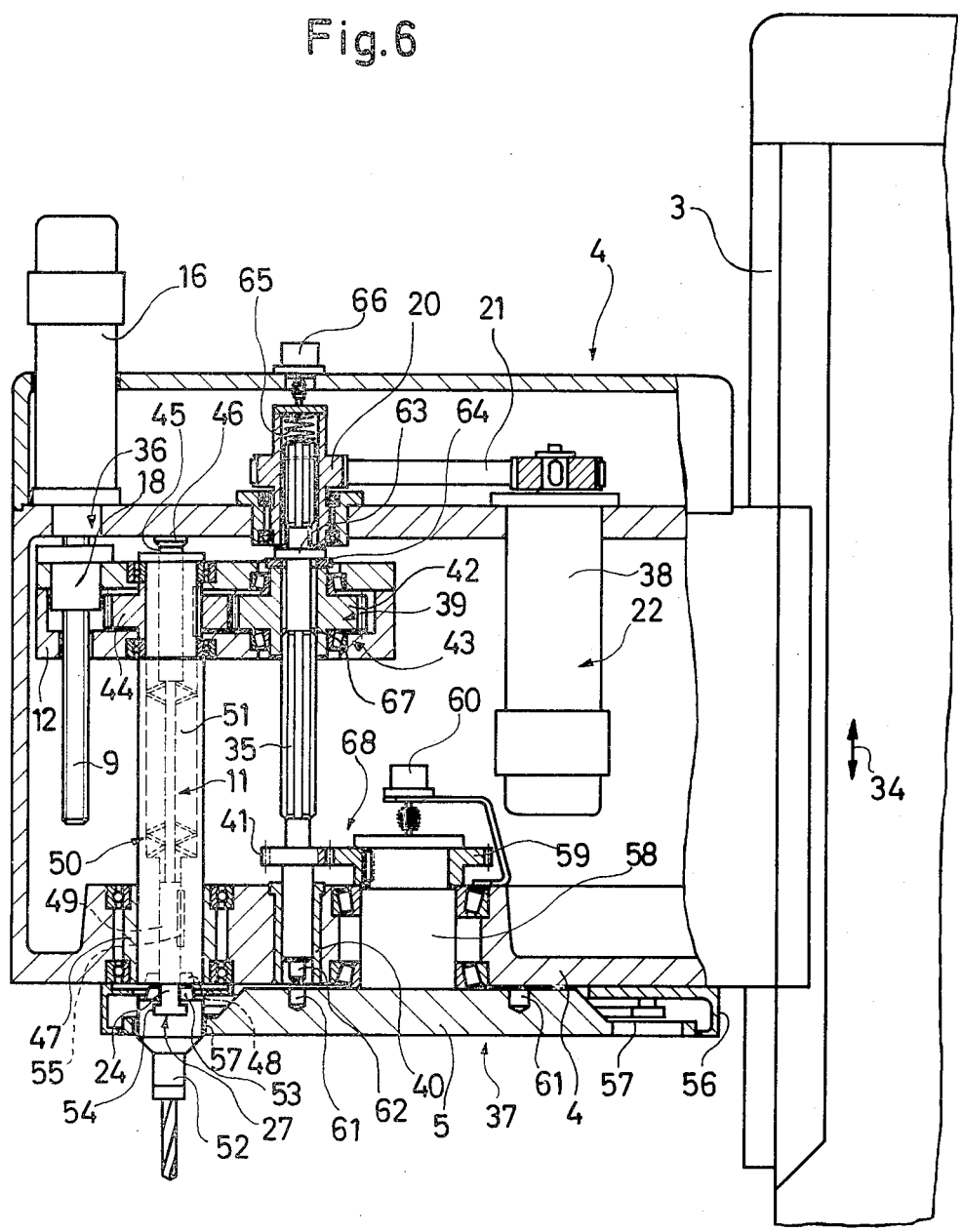
FIG. 6 is a sectional side view of the turret head of the machine tool of this invention constructed as a machining center and shown in a position during the tool exchange.
Figure 7:
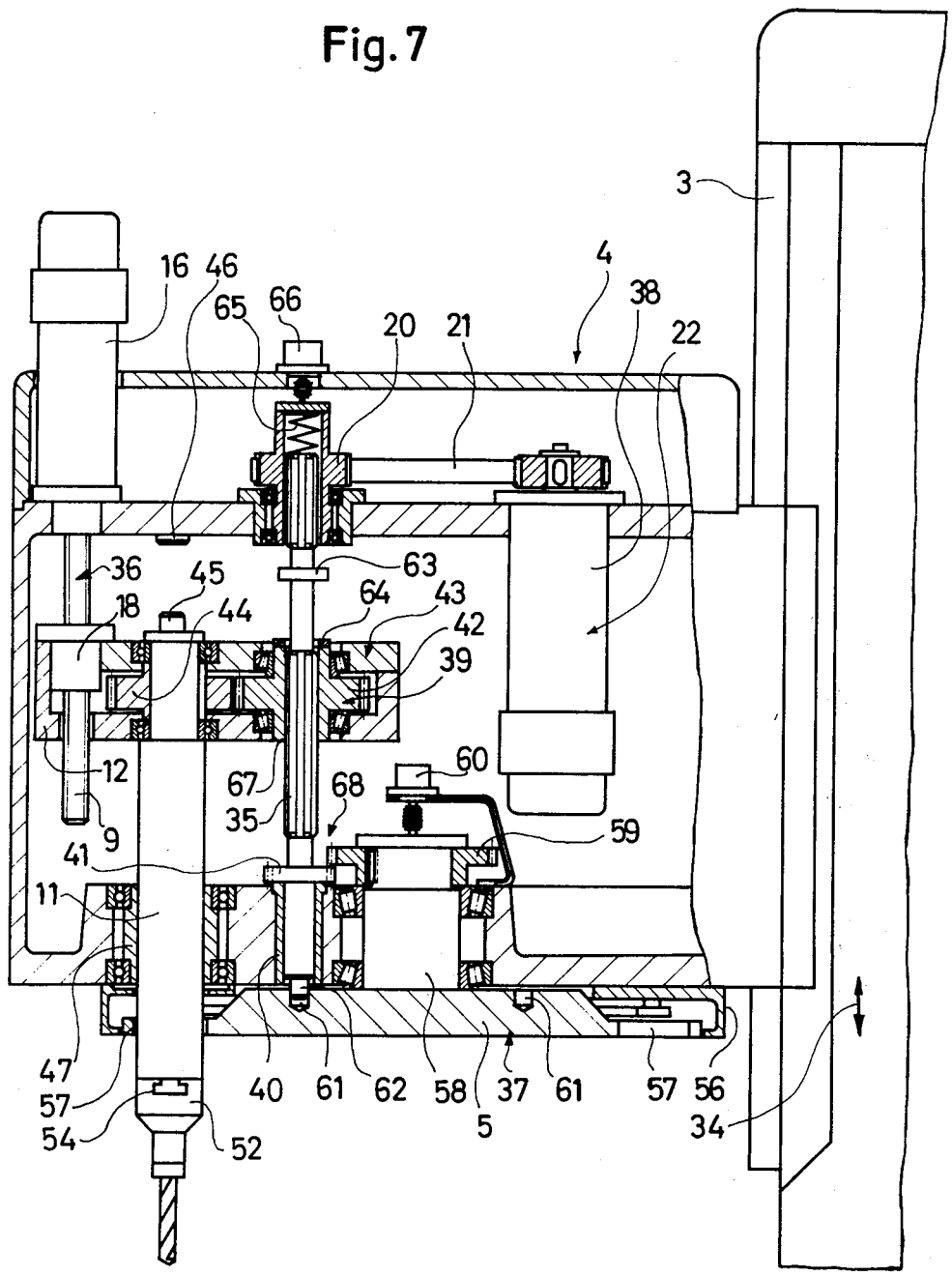
FIG. 7 is a view similar to that of FIG. 6 and showing the position of respective component parts during the working process.

FIGS. 6 and 7 illustrate a modification of the machine tool of this invention constructed as a machining center where base 1 supports the head 4 which is axially adjustable in both directions as indicated by arrow 35. Turret head 4 similarly as in the preceding example contains main driving motor 22, driving spindle 11, spline shaft 35, feed drive mechanism 36 and a tool exchanging turret 37 including a turret wheel 5.

The main driving motor 22 is again a direct current servo-motor 38 having a maximum power of 7.5 to 11 kilowatts, for example. The direct current motor 38 is a multipole motor with a permanent magnet field and has an extraordinarily large range of rotational speeds at an almost constant torsional moment. Its thermal time constant is more than 100 minutes. Heat which may rise in the motor when the latter is subject to peaks of torsional moments, substantially exceeding for a prolongated period of time the nominal torsional moment, can be dissipated in the armature having high amount of iron. For this reason, the direct current motor in its application in the machine tool of this invention can be exposed to a nominal power which is approximately one-half of its maximum power. The motor of this type hitherto is employed only as an auxiliary motor for driving the feeding mechanism. The maximum rotational speed of this motor is about 3000 revolutions per minute. Due to this relatively large range of rotational speeds transmission gears for driving spindles 11 can be constructed as two-stage transmission gears only. The direct current servo-motor 38 drives via a tooth belt or the like transmission means 21 a driving wheel 20 which is fixedly supported for rotation without axial movement in head 4. A spline shaft 35 is arranged for axial movement in the grooved central opening of the drive wheel 20 and extends downwardly through a grooved central opening of coupling wheel 39 arranged for rotation in housing block 12. The end portion of spline shaft 35 carries a gear 41 which functions as driving pinion for turret wheel 5 and the free end portion of shaft 35 is guided in a sleeve 40 fixed on the housing of head 4. In this embodiment, spline shaft 35 has a section between drive wheel 20 and coupling wheel 39 (which in this example is in the form of a gear 42), which is reduced in diameter and without splines so that the drive wheel 20 can be connected or disconnected from the gear 42 and this arrangement thus forms a clutch 43.

In housing block 12 there is further supported for rotation gear 44 keyed to driving spindle 11 and being in mesh with coupling gear 42. Upper free end 45 of driving spindle 11 projects from housing block 12 and in the uppermost position of the latter abuts against a fixed stop member 46 which is arranged on a partition in turret head 4. Feed mechanism 36 provides for vertical displacement of the housing block 12 together with gears 42 and 44 and driving spindle 11. The feed mechanism 36 includes similarly as in the preceding examples a direct current servo-motor 16 supported on the partition of turret head 4 and rotating a threaded feed spindle 9 which engages feed nut 18 connected to housing block 12. The lower end of driving spindle 11 projects through the housing of turret head 4 and is guided for axial and rotary movements in bearing sleeve 47 supported in the lower wall of the turret head housing. In this manner driving spindle 11 is movable together with housing block 12 in the feeding direction. Driving spindle 11 is terminated at its lower end with a coupling member 24 consisting of a centering conical member 48 and a holding member 49. The holding member 49 extends through a center passage in spindle 11 and its lower free end has a T-shaped cross-section. Biasing element 50 in the form of a set of springs 59 urges holding member inwardly. Coupling portion 24 operates worktool carrier 52 which at its face opposite the end of driving spindle 11 is provided with coupling part 27 in the form of a short cone 53 having a transverse groove matching the T-shaped end of holding member 49. Cone 53 snugly fits the centering conical member 48 and the T-shaped end of holding member 49 engages the corresponding groove 54 and in this manner the rotational moment of spindle 11 is transferred to the worktool. Holding member 49 is keyed to the inner wall of spindle 11 by a key 55 so that the former is axially guided and the connection and disconnection of the working tool carrier 52 is facilitated.

Worktool carriers 52 are seated in turret wheel 5 which forms the essential structural part of the tool exchanging device 37. Turret wheel 5 is provided for this purpose with through-holes 57 arranged near its periphery 56 and each tool carrier 52 as well as driving spindle 11 can pass through this through-hole 57. Axle 58 of turret wheel 5 is supported for rotation on the lower wall of turret head housing. Axle 58 is connected to gear 59 which is engageable with gear 41 of spline shaft 35. Above axle 58 position indicator 60 is arranged for reading the angular position of turret wheel 5. Upper surface of turret wheel 5 is provided with indexing recesses 61 adapted for receiving a stepped down end portion 62 of spline shaft 35 when the latter is in alignment with a corresponding indexing recess. The smooth section of spline shaft 35 below drive wheel 20 is provided with a collar 63 which rests on a buffer plate 64 on the upper surface of housing block 12. The upper free end of spline shaft 34 is spring-biased downwardly by means of a tension spring 65 and above drive wheel 20 is positioned on turret wheel housing a position indicator 66 for detecting the orientation of driving spindle 11.

FIG. 6 illustrates the machining or tooling center in a position in which tool exchange can be effected. Driving spindle 11 takes place in its starting position that means the end 45 of holding member 49 abuts against fixed stop 46, the whole spindle body is retracted in the housing in head 4 and turret wheel is free to rotate. Only the T-shaped portion of lower end of holding member 49 projects through the lower wall of head 4 to such an extent that tool carriers 52 together with its short cone portion 53 can be axially moved out of engagement with the centering conical member 48. During this axial movement, driving spindle 11 is in its "ready to release" position, namely at an angular position in which the groove 54 and holding member 49 are aligned relative to each other so that during the rotary movement of turret head 5 working tool holder 52 can be disengaged from holding member 49. To introduce the starting position of driving spindle 11, housing bloc 12 is lifted by means of feed drive 36 to its upper limit whereby also spline shaft 35 is lifted along by means of its collar 63 and splineless section 65 of shaft 35 is in the range of coupling gear 42 so that the latter is disengaged from driving wheel 20 and driving spindle 11 when brought into its starting position is thus disconnected from its drive. Gear 41 at the lower end of spline shaft 35 in contrast remains in engagement with gear 59 for driving turret wheel 5 while the step down end 64 of shaft 35 is lifted above indexing recess 61 in the upper surface of turret wheel 5. Main drive motor 22 keeps running and rotates via transmission means 21 driving wheel 20, spline shaft 35 and meshing gears 68 the turret wheel 5 until a new worktool carrier 52 is brought into alignment with driving spindle 11. In the program controlled machine of this invention it is not necessary to drive turret wheel 5 stepwise but instead the suitable program can bring any selected tool into alignment with driving spindle 11. As soon as the selected worktool is flush with spindle 11, the program provides for driving housing block 12 downwardly, holding member 49 disengages stop member 46 and biasing means 50 urge working tool carrier 52 against the bottom of driving spindle 11 so that coupling of the tool to the spindle is completed. Biasing spring 65 in the casing of driving wheel 20 causes spline shaft 35 at the beginning of the downward movement of housing block 12 to follow the latter so that gear 41 disengages gear 59 on the axle of turret wheel 5 and the latter is fixed in its position relative to the bottom of head housing by the step down end 62 which enters the underlying indexing recess 61. During the further feeding movement the uppermost splined section of shaft 35 engages the corresponding grooves in the central boring of coupling gear 42 to that torsional moment is imparted to the latter and consequently driving spindle 11 together with worktool carrier 52 start rotating. This position during the feeding movement in downward direction is indicated in FIG. 7 which shows the coupling of spindle 11 to tool carrier 52 and turret wheel 5 is fixed in its position by the lower end of spline shaft 35.

Figure 8:
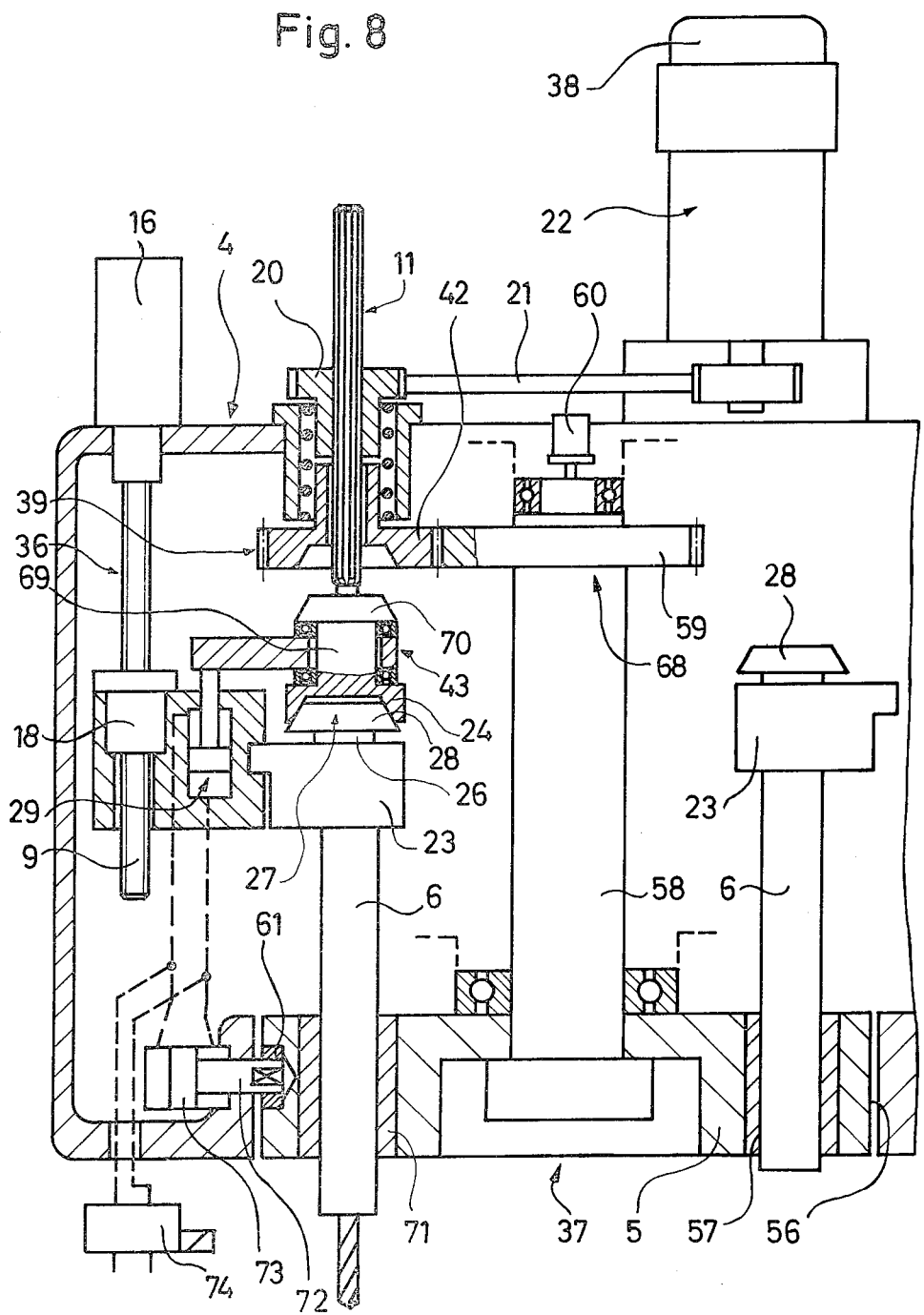
FIG. 8 shows a sectional side view of still another embodiment of the turret drilling machine shown during its working position.

In the embodiment as illustrated in FIG. 8 the machine tool of this invention is again constructed as a drill machine having a combined drive for driving spindle and turret wheel. Construction parts corresponding to those in the embodiments according to FIGS. 1 to 7 are designated by like reference numerals.

Driving spindle 11 in this embodiment is again in the form of a spline shaft axially movable in the grooved central boring of the driving wheel 20 and passing through coupling gear 39 adapted for engaging gear 59 connected to the axle of turret wheel 5. The lower end of driving spindle 11 is terminated with a frustoconical clutch member 70 which is engageable with matching recess in coupling gear 39 to establish frictional connection therebetween. The worktool carrier 52 consists again of drive spindle 6 with a gear box 23 including suitable transmission gears. Gear box 23 is connected to a feed mechanism which moves spindle 6 in axial direction in sleeve 71 provided in thread wheel 5. Coupling part 70 connected to the lower end of driving spindle 11 is extended downwardly to form a coupling body 69 provided with a peripheral groove engaging a coupling fork connected at its free ends to a piston of a cylinder-piston unit 29 arranged in housing block 12. Similarly as in the preceding examples, duct 12 accommodates nut 18 of feed mechanism. Jacket wall of turret wheel 5 is provided with indexing recesses 61 to which engage piston rod of separate cylinder-piston unit 73. Cylinder-piston units are controlled hydraulically via switching valve 74.

FIG. 8 illustrates the drill machine of this invention in its operational position in which feed mechanism 36 moves housing block 12 downwardly and this downward movement is imparted both to driving spindle 11 and to drill spindle 6. The feeding is again program controlled according to the process practise. As soon as a working cycle is completed, the feed mechanism 36 retracts both the driven spindle 6 and driving spindle 11. At a certain upper limit position of the driving spindle 6 the driving spindle 11 together with its coupling body 69 is still further lifted by means of hydraulic drive unit 29 so that frictional coupling between the driving spindle 11 and driven spindle 6 is disconnected and instead frustoconical coupling element 70 engages corresponding recess in coupling wheel 39 and turret wheel 5 is brought via gear 69 into rotational movement. With the actuation of power unit 29 is also activated power unit 73 in the direction in which piston rod 72 is disengaged from indexing recess 61 and the rotation of turret wheel 5 is released. Subsequently a new drill spindle is brought into its operative position where it is in alignment with driving spindle 11 and in this position hydraulic power unit 29 drives coupling body 69 together with coupling element 70 downwardly. As a consequence, frictional coupling between driving spindle 11 and driven spindle 6 is re-established and the entire device 37 for worktool exchange is disconnected. Thereupon hydraulic power unit 73 is operated to engage its bolts or piston rod 72 into the new indexing recess 61 in the jacket of turret wheel 5.

It should be understood that each of the elements described above, or two or more together, may also find a useful application in other types of constructions differing from the type described above.

While the invention has been illustrated and described as embodied in a turret drill, it is not intended to be limited to the details shown, since various modifications and structural changes may be made without departing in any way from the spirit of the present invention.

What is claimed as new and desired to be protected by Letters Patent is set forth in the appended claims:

1. In a machine tool having a driving spindle, a turret wheel for holding a plurality of tool carriers and for displacing a selected tool carrier into an operational position in alignment with said driving spindle, and means for coupling said driving spindle to the selected tool carrier, a combination comprising a direct current motor for driving said driving spindle, said motor having a relatively stable torque in a wide range of rotational speeds, and programmable means for electrically controlling the rotational speed and the angular rest position of the rotor of said motor and the feeding movement and speed of said tool carrier according to a predetermined program prepared for machining a particular workpiece.

2. A combination as defined in claim 1, wherein said direct current motor is a servo-motor having a permanent magnetic field.

3. A combination as defined in claim 1, wherein the power output of said electromotor for 100 percent operational time of the machine is designed to be approximately the half of its maximum power output.

4. In a machine as defined in claim 1 constructed in the form of a turret drill, a combination comprising drill spindles each including tool carrier and transmission gears arranged between said tool carrier and said coupling means, the transmission ratio in at least one group of said drill spindles being the same.

5. In a turret drill machine having a driving spindle, a turret wheel for holding a plurality of tool carriers and for displacing a selected tool carrier into an operational position in alignment with said driving spindle, means for coupling said driving spindle to the selected tool carrier and means for displacing said tool carrier in a feeding direction, a combination comprising a direct current motor for driving said driving spindle, said motor having a relatively stable torque in a wide range of rotational speeds, programmable means for electrically controlling the rotational speed of said motor and the feeding movement of said tool carrier according to a predetermined program prepared for machining a particular workpiece, a plurality of drill spindles each including tool carrier and transmission gears arranged between said tool carrier and said coupling means, the transmission ratio in at least one group of said drill spindles being the same, and wherein one group of drill spindles in said machine has transmission gears with a first transmission ratio and another group of spindles has gear with a different transmission ratio.

6. The combination as defined in claim 5, wherein said first group includes gears with transmission ratio 1:1 and said other group includes gears with transmission ratio 4:1.

7. The combination as defined in claim 1 further including additional clutch means for coupling said turret wheel to said driving motor.

8. The combination as defined in claim 7, wherein said turret wheel includes indexing recesses distributed in accordance with the location of respective tool carriers, and arresting means connected to said additional coupling means to engage one of said indexing recesses in selected angular position of said turret wheel.

9. The combination as defined in claim 7, wherein a peripheral portion of said turret wheel is provided with through-bores for driving said tool holders and said driving axles during their axial displacement in feeding direction.

10. In a machine tool having a driving spindle, a turret wheel for holding a plurality of tool carriers and for displacing a selected tool carrier into an operational position in alignment with said driving spindle, means for coupling said driving spindle to the selected tool carrier and means for displacing said tool carrier in a feeding direction, a combination comprising a direct current motor for driving said driving spindle, said motor having a relatively stable torque in a wide range of rotational speeds, programmable means for electrically controlling the rotational speed of said motor and the feeding movement of said tool carrier according to a predetermined program prepared for machining a particular workpiece, additional clutch means for coupling said turret wheel to said driving motor, and wherein said turret wheel has an axle provided with a gear, said gear being engageable with transmission gears to said driving motor.

11. A combination as defined in claim 10, wherein said auxiliary coupling means includes a switching mechanism for alternately coupling the driving motor to said driving spindle and when the driving spindle is in its starting position, to said turret wheel.

12. The combination as defined in claim 7, wherein said clutch means includes a spline shaft and a coupling gear having a grooved central passage for engaging the splines of said spline shaft.

13. In a machine tool having a driving spindle, a turret wheel for holding a plurality of tool carriers and for displacing a selected tool carrier into an operational position in alignment with said driving spindle, means for coupling said driving spindle to the selected tool carrier and means for displacing said tool carrier in a feeding direction, a combination comprising a direct current motor for driving said driving spindle, said motor having a relatively stable torque in a wide range of rotational speeds, programmable means for electrically controlling the rotational speed of said motor and the feeding movement of said tool carrier according to a predetermined program prepared for machining a particular workpiece, additional clutch means for coupling said turret wheel to said driving motor, said additional clutch means including a spline shaft and a coupling gear having a grooved central passage for engaging the splines of said spindle shaft, and wherein said driving spindle is positively connected to the driving gear, said driving gear being in mesh with said coupling gear.

14. The combination as defined in claim 12 further including a driving wheel driven by said direct current motor and having a grooved center opening engaging said spline shaft to drive the latter and to permit its axial movement.

15. The combination as defined in claim 13, wherein said coupling gear and said driving gear are arranged in a common housing block and the inner wall portion of said turret head facing the top surface of the driving spindle being provided with a fixed stop member to limit the upward movement of said driving spindle.

16. The combination as defined in claim 15, further including a feed mechanism for axially displacing said housing block with said coupling and driving gears.

17. The combination as defined in claim 11, wherein said spline shaft carriers a gear which in dependence on the vertical position of the spline shaft in which it is disconnected from said coupling gear for said driving spindle is engageable with said gear for the drive wheel.

18. The combination as defined in claim 11, wherein said top surface portion of said turret wheel facing said spline shaft is provided with indexing bores engageable with lower end of said spline shaft to fix working positions of said driving spindle.

19. The combination as defined in claim 9, wherein an angular position indicator is coupled to the axle of said turret wheel to indicate its angular position.

20. The combination as defined in claim 14, wherein an angular position indicator is coupled to said driving wheel to indicate the angular position of said driving spindle.

21. In a machine tool having a driving spindle, a turret wheel for holding a plurality of tool carriers and for displacing a selected tool carrier into an operational position in alignment with said driving spindle, means for coupling said driving spindle to the selected tool carrier and means for displacing said tool carrier in a feeding direction, a combination comprising a direct current motor for driving said driving spindle, said motor having a relatively stable torque in a wide range of rotational speeds, programmable means for electrically controlling the rotational speed of said motor and the feeding movement of said tool carrier according to a predetermined program prepared for machining a particular workpiece, additional clutch means for coupling said turret wheel to said driving motor, and wherein said coupling mechanism for said tool spindle includes an intermediate coupling disc co-axially attached to said driving spindle and defining two opposite coupling surfaces, said driving spindle being axially movable between a first switching position in which one coupling surface of said intermediate member is in engagement with said coupling gear and a second position in which said one coupling surface is disengaged from said coupling gear and the other coupling surface is in engagement with said drill spindle.

22. The combination as defined in claim 21, wherein said driving spindle is in the form of a splined shaft, said coupling and said driving wheel having grooved central openings engaging said splined shaft and said direct current driving motor being coupled to said driving wheel.

23. The combination as defined in claim 22, further including a reciprocable power drive coupled to said intermediate coupling member to displace the same between said two switching positions.

24. The combination as defined in claim 23, wherein said power drive driven for axial displacement by said feed mechanism and being coupled to said tool spindle to impart its axial movement thereto.

25. The combination as defined in claim 24, wherein said feeding mechanism includes a feed spindle driven by a direct current servo-motor, and a spindle nut attached to said housing block and being in engagement with said feed spindle.

26. The combination as defined in claim 9, further including an additional reciprocating power unit for driving an indexing bolts, said turret wheel being provided with indexing bores engageable with said bolt.

27. The combination as defined in claim 26, wherein said reciprocating power drive is controllable simultaneously with said power drive for said intermediate coupling member.

28. The combination as defined in claim 1, further including a numerically controlled programmable unit for automatically controlling the actuating of said driving motor.

29. The combination as defined in claim 1, further including a tubular sleeve surrounding said driving spindle, and being movable therewith in axial direction, said tubular sleeve accommodating biasing springs for urging said driving spindle upwardly relative to said sleeve, the lower end of said spindle being provided with a T-shaped connecting piece, and further including a tool holder having a T-shaped cutout engageable laterally with said T-shaped connecting means and urged by said biasing spring into engagement with said sleeve.

30. The combination as defined in claim 29, wherein said tool holders is provided with a centering conical projection engaging a corresponding conical recess in said sleeve.

* * * * *